United States Patent
Ng et al.

(10) Patent No.: US 11,334,722 B2
(45) Date of Patent: May 17, 2022

(54) METHOD OF SUMMARIZING TEXT WITH SENTENCE EXTRACTION

(71) Applicant: Hong Kong Applied Science and Technology Research Institute Company Limited, Hong Kong (HK)

(72) Inventors: Yu Keung Ng, Hong Kong (HK); Yang Liu, Hong Kong (HK); Chao Feng, Shenzhen (CN); Yi Ping Tse, Hong Kong (HK); Zuyao Wang, Hong Kong (HK); Zhi Bin Lei, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 365 days.

(21) Appl. No.: 16/578,427

(22) Filed: Sep. 23, 2019

(65) Prior Publication Data
US 2021/0089622 A1  Mar. 25, 2021

(51) Int. Cl.
*G06F 40/30* (2020.01)
*G06F 16/33* (2019.01)
*G06F 16/34* (2019.01)

(52) U.S. Cl.
CPC .......... *G06F 40/30* (2020.01); *G06F 16/3347* (2019.01); *G06F 16/345* (2019.01)

(58) Field of Classification Search
CPC .... G06F 40/30; G06F 16/3347; G06F 16/345; G06F 40/216; G06F 40/289; G06F 40/284; G06F 40/00; G06F 40/10; G06F 40/20
See application file for complete search history.

(56) References Cited

U.S. PATENT DOCUMENTS

| | | | | |
|---|---|---|---|---|
| 7,698,339 B2* | 4/2010 | Zhang | .................. | G06F 16/345 707/755 |
| 9,977,829 B2* | 5/2018 | Simske | .............. | G06F 16/3326 |

(Continued)

FOREIGN PATENT DOCUMENTS

| CN | 102945228 A | 2/2013 |
|---|---|---|
| CN | 108153864 A | 6/2018 |

(Continued)

OTHER PUBLICATIONS

International Search Report and Written Opinion of corresponding PCT Patent Application No. PCT/CN2019/111778 dated Jun. 22, 2020.

*Primary Examiner* — Abdelali Serrou
(74) *Attorney, Agent, or Firm* — Idea Intellectual Limited; Margaret A. Burke; Sam T. Yip

(57) ABSTRACT

A method for summarizing text with sentence extraction including steps as follows. Sentences are extracted from a document including text by a natural language processing (NLP) based feature extractor. A word vector set with respect to each of the sentences is generated by a processor. The word vector set with respect to each of the sentences is used to generate a n-grams vector set and a phrase-n vector set with respect to each of the sentences. A word score representing similarity between the word vector sets, a n-grams score representing similarity between the n-grams vector sets, and a phrase-n score representing similarity between the phrase-n vector sets are computed. The word, n-grams, and phrase-n scores are combined to compute an edge score. Text features are selected from the sentences using the edge scores of the sentences, so as to output a summary of the document.

20 Claims, 4 Drawing Sheets

(56) References Cited

U.S. PATENT DOCUMENTS

| | | | |
|---|---|---|---|
| 2002/0174149 A1 | 11/2002 | Conroy et al. | |
| 2006/0206806 A1* | 9/2006 | Han | G06F 16/345 |
| | | | 715/236 |
| 2009/0193328 A1* | 7/2009 | Reis | G06N 5/025 |
| | | | 715/231 |
| 2012/0253792 A1 | 10/2012 | Bespalov et al. | |
| 2012/0310627 A1* | 12/2012 | Qi | G06F 40/30 |
| | | | 704/9 |
| 2014/0379378 A1 | 12/2014 | Cohen-Solal et al. | |
| 2015/0074027 A1* | 3/2015 | Huang | G06F 40/40 |
| | | | 706/25 |
| 2016/0140221 A1* | 5/2016 | Park | G06F 16/3331 |
| | | | 715/254 |
| 2020/0004803 A1* | 1/2020 | Dernoncourt | G06F 40/106 |
| 2021/0042391 A1* | 2/2021 | Gehrmann | G06N 3/08 |

FOREIGN PATENT DOCUMENTS

| | | |
|---|---|---|
| JP | 09319768 A | 12/1997 |
| WO | 2013043160 A1 | 3/2013 |

\* cited by examiner

METHOD OF SUMMARIZING TEXT WITH SENTENCE EXTRACTION

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to the field of natural language process (NLP). More specifically, the present invention relates to techniques of extracting sentences from a document for generating a summary of the document.

BACKGROUND OF THE INVENTION

Text summarization is one of the difficult tasks in the field of natural language processing (NLP). With the number of electronically-accessible documents now greater than ever before, the overwhelming amount of textual information makes it difficult for readers to quickly decipher all relevant information thereof. Text summarization tools may provide one solution for such reading problem. The goal of text summarization is to shorten a text passage containing a lot of pieces, such that reader can identify the main message of the text passage quickly and efficiently. One of methods is based on selecting the most important sentences from the text passage. That is, the selected sentences are not modified, but remain the same. In other words, the summarized text is not in a rewritten form, but a selection of a sub-group of the original sentences among the group of all sentences composing the text passage. However, determining the relative importances of sentences is a highly complex process, and accuracy remains a much studied and wanted issue in the current state of the art.

SUMMARY OF THE INVENTION

In view of the above, the present invention provides an apparatus and method for summarizing text with sentence extraction. In accordance to one aspect of the present invention, a plurality of sentences are extracted from a text passage or document by a NLP based feature extractor. A word vector set with respect to each of the sentences is generated by a processor. The word vector set with respect to each of the sentences is used to generate a n-grams vector set and a phrase-n vector set with respect to each of the sentences by the processor, in which n is a positive integer greater than 1. A word score representing degree of similarity between the word vector sets, a n-grams score representing degree of similarity between the n-grams vector sets, and a phrase-n score representing degree of similarity between the phrase-n vector sets are computed by the processor. The word score, the n-grams score, and the phrase-n score are combined to compute an edge score representing degree of similarity between the two sentences by the processor. Text features are selected from the sentences using the edge scores of the sentences, so as to output a summary of the document.

The present invention provides an apparatus for summarizing text with sentence extraction including an NLP based feature extractor and a processor. The NLP based feature extractor is configured to extract a plurality of different sentences from a document including text. The processor is configured to generate a word vector set with respect to each of the sentences and use the word vector set with respect to each of the sentences to generate a n-grams vector set and a phrase-n vector set with respect to each of the sentences, in which n is a positive integer greater than 1. The processor is further configured to compute a word score representing similarity between the word vector sets, a n-grams score representing similarity between the n-grams vector sets, and a phrase-n score representing similarity between the phrase-n vector sets, and the word score, the n-grams score, and the phrase-n score are combined to compute an edge score representing similarity between the two sentences. The processor is further configured to select text features from the sentences using the edge scores of the sentences, so as to output a summary of the document.

The advantages of the present invention include: better performance for text summarization due to its determination of degree of similarity between sentences by defining edge connection thereof; a solution to handle different types of text (i.e. same wording and synonyms); and a solution to handle extra word effect and word ordering effect.

BRIEF DESCRIPTION OF THE DRAWINGS

Embodiments of the invention are described in more detail hereinafter with reference to the drawings, in which.

DETAILED DESCRIPTION

In the following description, natural language processing (NLP) methods and apparatuses for summarizing text with sentence extraction, and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention provides a method and an apparatus for summarizing text, which can be incorporated in various NLP methods and systems. In accordance to one embodiment of the present invention, provided is a method that integrates an extraction stage, a scoring stage, and a rank stage. The stage-integration comprises a disassembly of an NLP-based summarizing system into at least two logical components: a feature extractor and a processor.

In accordance to one embodiment, the feature extractor is an NLP-based feature extractor. At design time, the feature extractor is trained with a training dataset containing words and characters of a selected language. During training, a stop-words database is constructed such that the feature extractor is trained to recognize stop words (e.g. a commonly used word, such as "the", "a", "an", "or", "and", "he", "she", or the likes). The stop-words database may be implemented in one or more databases and/or file systems local or remote to the feature extractor's run-time execution computing devices and/or processing servers.

In accordance to one embodiment, the processor is trained to generate vector space by mapping words or phrases from a set to vectors of real numbers. The training of the processor constructs a feature vector database. The feature vector database may be implemented in one or more databases and/or file systems local or remote to the processor's run-time execution computing devices and/or servers. The processor is configured to map words extracted from a sentence by the feature extractor to word vectors, so as to generate a word vector set. The processor is further configured to execute calculation in linear algebra, such as calculation in vector or matrix. For example, if word vectors in a first sentence span a first space and word vectors in a second sentence span a second space, principal angles between the first space and the second space found by singular value decomposition (SVD) are summed up to achieve the calculation.

Figure 1:
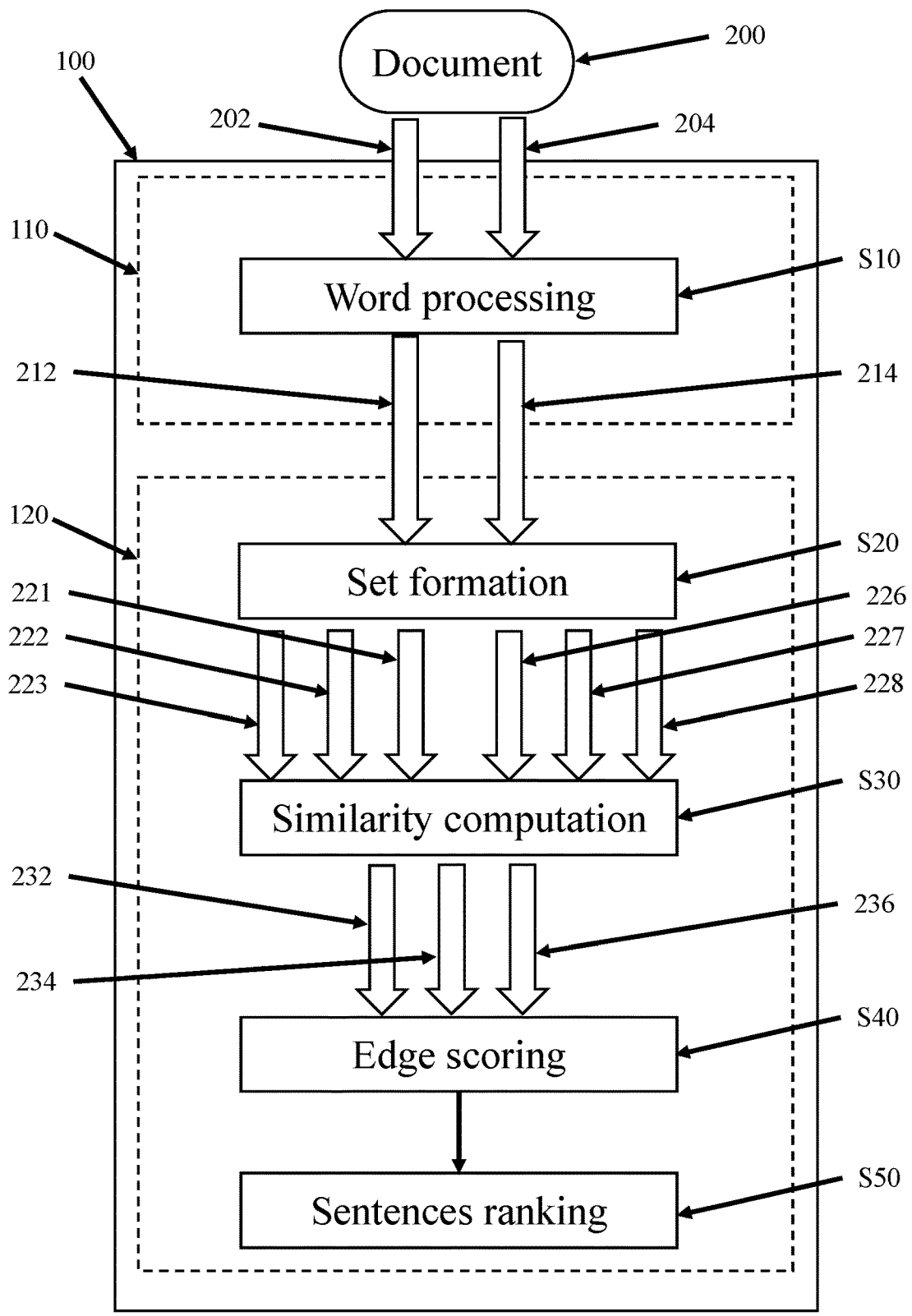
FIG. 1 illustrates a simplified logical structural and data-flow diagram flowchart of a method for summarizing text with sentence extraction which is executed by an NLP-based summarizing system.

FIG. 1 illustrates a simplified logical structural and dataflow diagram flowchart of a method for summarizing text with sentence extraction which is executed by an NLP-based summarizing system 100, in which the NLP-based summarizing system 100 includes a feature extractor 110 and a processor 120 as discussed above. The method is performed on a text document 200 to output a summary of the document 200. Specifically, the document 200 may have a plurality of sentences, and the method is performed such that some of the sentences having more important information are extracted for generating the summary. The degree of similarity between any two of the sentences is determined by computing an edge score thereof, and then all of the edge scores are then used in a ranking of the sentences of the document 200, thereby selecting the sentences for inclusion in the summary of the document 200.

As shown in FIG. 1, the method includes operations S10, S20, S30, S40, S50. The operation S10 is a word processing; the operation S20 is a set formation; the operation S30 is a computation of degree of similarity; the operation S40 is edge scoring; and the operation S50 is sentences ranking.

In the exemplary illustration of FIG. 1, a first sentence 202 and a second sentence 204 of the document 200 are fed to the feature extractor 110 for starting with the operation S10. To illustrate, the first sentence 202 and the second sentence 204 are assumed not exactly the same. For example, the first sentence 202 may contain the text "Mathematics exam is coming soon" and the second sentence 204 may contain the text "Peter and Mary do revision on Mathematics together". The word processing S10 is executed by the feature extractor 110 to filter the first sentence 202 and the second sentence 204 by removing certain words therein. In one embodiment, the removed words are stop words. In this example, after the word processing S10, the first sentence 202 is filtered to generate a first word set 212 having "Mathematics", "exam", "coming", "soon", and the second sentence 204 is filtered to generate a second word set 214 having "Peter", "Mary", "revision", "Mathematics", "together".

After the word processing S10, the first word set 212 and the second word set 214 are fed to the processor 120 for starting with the operation S20. The set formation S20 is executed by the processor 120 to generate a word vector set, a n-grams vector set, and a phrase-n vector set with respect to each of the first word set 212 and the second word set 214 (i.e. with respect to each of the first sentence 202 and the second sentence 204), in which n is a positive integer greater than 1. For example, the n-grams vector set may be set as a 2-grams or 3-grams vector set.

In one embodiment, a first word vector set 221 is generated by using word embedding to convert each of the words of the first word set 212 into a high dimensional vector. That is, each of the words of the first word set 212 may serve as a first feature vector to generate a first word vector set 221. In this regard, since the number of the words of the first word set 212 is four (i.e. in the afore-described illustrative example, "Mathematics", "exam", "coming", and "soon"), the first word vector set 221 may have the four first feature vectors which can be respectively labeled as a sequence of numbers with positive integers, such as the first word vector set 221 is {"Mathematics", "exam", "coming", "soon"}={$\vec{a}_1, \vec{a}_2, \vec{a}_3, \vec{a}_4$}. By converting sentences into word vector sets, it is particularly advantageous in solving different types of text (i.e. same wording and synonyms) issue. Thereafter, a first n-grams vector set 222 and a first phrase-n vector set 223 can be generated by using the first word vector set 221.

In the generation of the first n-grams vector set 222, each of second feature vectors thereof is generated by a summation of the consecutive n first features. For example, if the first n-grams vector set 222 is a 2-grams vector set, each of the second feature vectors of the first n-grams vector set 222 is generated by a sum of the consecutive two first feature vectors of the first word vector set 221. That is, the first n-grams vector set 224 that serves as a 2-grams vector set may have three second feature vectors, such that the first n-grams vector 224={$\vec{c}_1, \vec{c}_2, \vec{c}_3$}, and each of the second feature vectors satisfies: $\vec{c}_i=\vec{a}_i+\vec{a}_{i+1}$. More specifically, the first n-grams vector set 222 is generated by combining information of the consecutive two words of the first word set 212. In the afore-described illustrative example, the first n-grams vector set 222 is {"Mathematics exam", "exam coming", "coming soon"}. This is particularly advantageous in solving extra word(s) issue.

In the generation of the first phrase-n vector set 223, each of third feature vectors thereof is generated by concatenating the consecutive n first feature vectors in the same column. For example, if the first phrase-n vector set 223 is a phrase-2 vector set, each of third feature vectors of the first phrase-n vector set 223 is generated by concatenating the consecutive two first feature vectors of the first word vector set 221 in the same column. That is, the first phrase-n vector set 223 that serves as a phrase-2 vector set may have three third feature vectors, such that the first phrase-n vector set 223={$\vec{e}_1, \vec{e}_2, \vec{e}_3$}, and each of the third feature vectors satisfies:

$$\vec{e}_i = \begin{bmatrix} \vec{a}_i \\ \vec{a}_{i+1} \end{bmatrix}.$$

More specifically, the first phrase-n vector set 223 is generated by combining feature vectors of the consecutive two words of the first word set 212, hence the dimension of the first phrase-n vector set 223 is double of that of the first word vector set 221. This is particularly advantageous in solving word order issue.

In one embodiment, a second word vector set 226 is generated in the same manner as that of the first word vector set 221. In the afore-described illustrative example, the second word vector set 226 has five fourth feature vectors due to the second word set 214 having five words (i.e.

"Peter", "Mary", "revision", "Mathematics", "together"), such that the second word vector set 226={"Peter", "Mary", "revision", "Mathematics", "together"}={$\vec{b}_1$, $\vec{b}_2$, $\vec{b}_3$, $\vec{b}_4$, $\vec{b}_5$}. Similarly, a second n-grams vector set 227 can be generated in the same manner as that of the first n-grams vector set 222 to have four fifth feature vectors, such that the second n-grams vector set 227={$\vec{d}_1$, $\vec{d}_2$, $\vec{d}_3$, $\vec{d}_4$}, and a second phrase-n vector set 228 can be generated in the same manner as that of the first phrase-n vector set 223 to have four sixth feature vectors, such that the second phrase-n vector set 228={$\vec{t}_1$, $\vec{t}_2$, $\vec{t}_3$, $\vec{t}_4$}.

Figure 2:
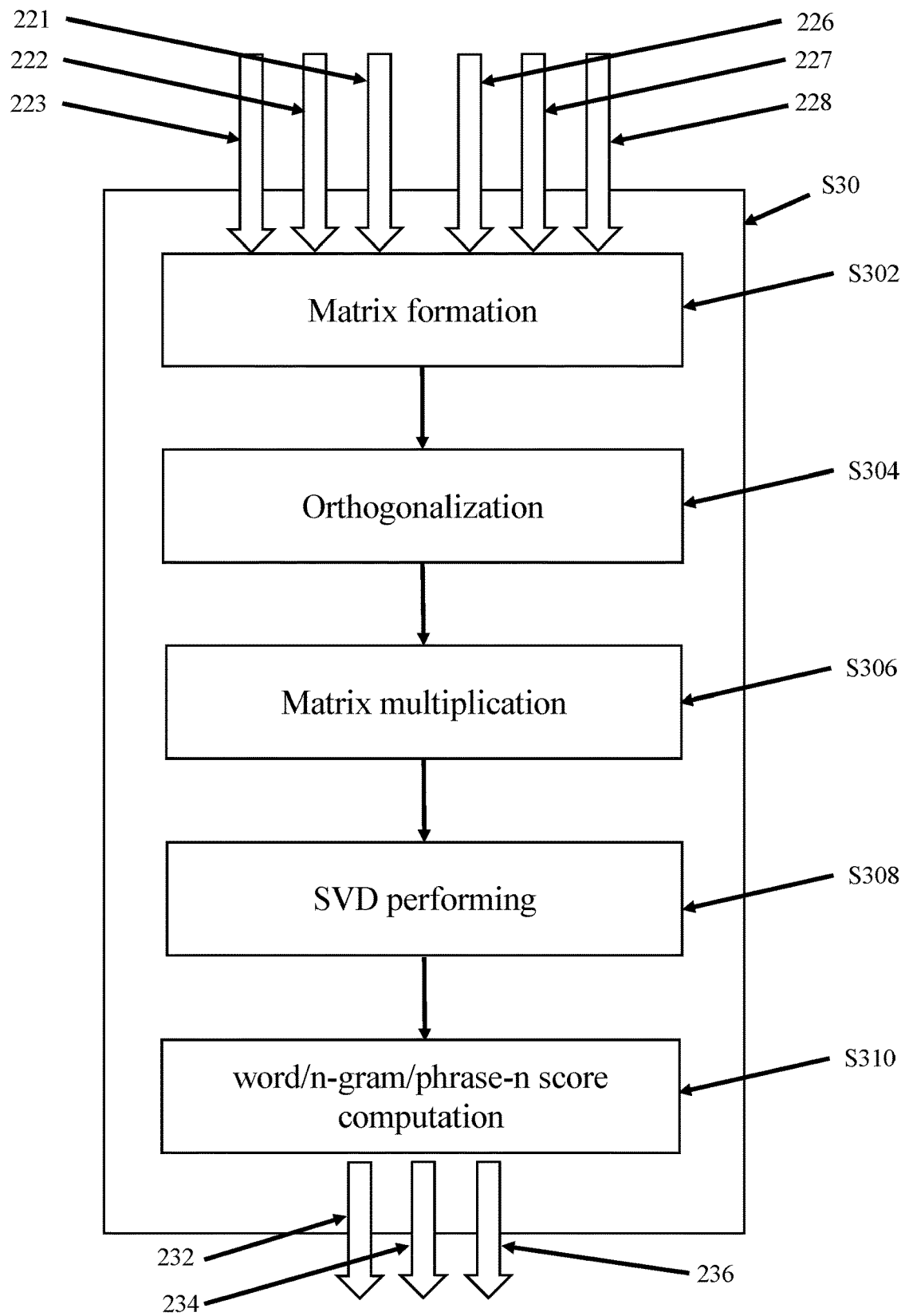
FIG. 2 illustrates a simplified logical structural and data-flow diagram flowchart of the operation.

After generating the set formation, the operations S30 is executed by the processor 120. Reference is made to FIG. 2, which illustrates a simplified logical structural and dataflow diagram flowchart of the operation S30. The operation S30 includes steps S302, S304, S306, S308, and S310. The step S302 is matrix formation; the step S304 is orthogonalization; the step S306 is matrix multiplication; the step S308 is SVD performing; and the step S310 is word/n-gram/phrase-n score computation.

In the operation S30, degrees of similarity between the first and second word vector sets 221, 226/n-grams vector sets 222, 227/phrase-n vector sets 223, 228 are determined in accordance with a word score 232, a n-gram score 234, and a phrase-n score 236 respectively. The word score 232, the n-gram score 234, and the phrase-n score 236 are computed individually, as stated below.

In step S302, the first word vector set 221 and the second word vector set 226 are processed to respectively generate a first matrix and a second matrix that represent a first space spanned by the first word vectors set 221 and a second space spanned by the second word vector sets 226 respectively. In step S304, the first matrix and the second matrix are processed by performing orthogonalization on the first matrix and the second matrix. In step S306, the orthogonalized first and second matrices are processed to derive the matrix multiplication from the orthogonalized first and second matrices. In one embodiment, the matrix multiplication is generated with transpose. For example, if the orthogonalized first and second matrices are Q and P, the matrix multiplication can be expressed as $Q^T P$.

Thereafter, in step S308, the matrix multiplication is processed by performing SVD thereon. With the SVD, the matrix multiplication $Q^T$ is derived to satisfy:

$$Q^T P = U\Sigma V^T, \text{ where } \Sigma = \begin{bmatrix} \sigma_1 & 0 & 0 \\ 0 & \ddots & 0 \\ 0 & 0 & \sigma_n \end{bmatrix};$$

where all $\sigma_i$ are referred to as angles between the first and second spaces spanned by the first and second word vector sets 221 and 226. That is, with the SVD, diagonal elements of a diagonal matrix $\Sigma$ are determined. In step S310, the diagonal matrix $\Sigma$ is processed by summing up the diagonal elements of the diagonal matrix $\Sigma$, thereby computing the word score 232. In one embodiment, the sum of the diagonal elements is normalized. For example, the word score 232 is derived by an equation:

$$s1 = \frac{1}{n}\Sigma\,\sigma_i,$$

where s1 is the word score 232. Since $\sigma_i$, which are defined as the angles as above, can represent the degree of similarity of the spanned first and second spaces, the word score 232 derived according to $\sigma_i$ represents the degree of similarity between the first and second word vector sets 221 and 226.

By using the same computation as that for the word score 232 of the first and second word vector sets 221 and 226, the n-gram score 234 representing the similarity between the first and second n-grams vector sets 222, 227 and the phrase-n score 236 representing the similarity between the first and second phrase-n vector 223 and 228 respectively can be computed as well.

Referring to FIG. 1 again. The word score 232, the n-gram score 234, and the phrase-n score 236 are combined by executing the operation S40, and the combination thereof is referred as to an edge score, which represents the degree of similarity between the first sentence 202 and the second sentence 204.

In one embodiment, the edge score is derived by an equation:

$$ES = \alpha * s1 + \sum_{n=2}^{K} \beta_n * s2 + \sum_{n=2}^{K} \gamma_n * s3$$

where ES is the edge score, s1 is the word score, s2 is the n-grams score, s3 is the phrase-n score, and coefficients $\alpha$, $\beta_n$, and $\gamma_n$ are positive. In this regard, the coefficients $\alpha$, $\beta_n$, and $\gamma_n$ serve as the weighting numbers for each individual score respectively, and the sum of the coefficients $\alpha$, $\beta_n$, and $\gamma_n$ is equal to 1. The parameters n and K are defined by the n-gram vector sets and the phrase-n vector sets. In one embodiment, the n-gram vector sets are 2-gram vector sets and the phrase-n vector sets are phrase-2 vector sets, and both of the parameters n and K are "2" and coefficients $\alpha$, $\beta_n$, and $\gamma_n$ can be set as $\alpha$=0.6, $\beta_2$=0.3, and $\gamma_2$=0.1. In another embodiment, if 3-grams vector sets are used, 2-grams vector sets and 3-grams vector sets would be constructed and the parameters n and K are set as n=2 and K=3.

Accordingly, edge scores between all sentence pairs in the document 200 are computed. For example, if the document 200 contains x sentences, from these x sentences, $$\frac{x*(x-1)}{2}$$

number of edge scores are computed. The edge scores then correlates with the importances of the sentences of the document 200.

Figure 3:
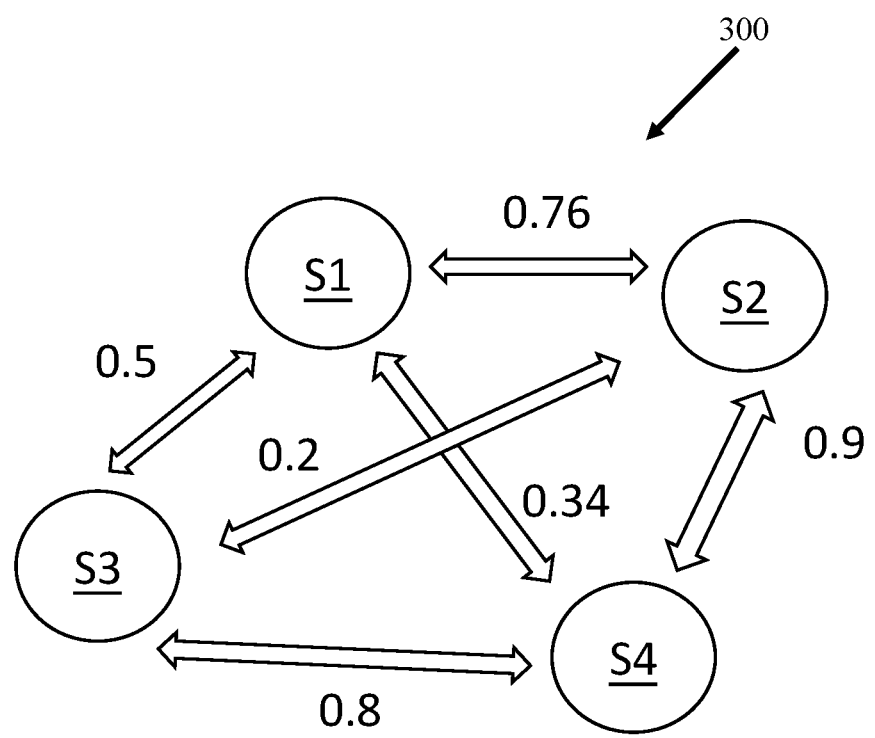
FIG. 3 illustrates a graph with a structure corresponding to a document including text.

In an exemplary illustration aided by FIG. 3, four sentences are extracted and are labeled as nodes S1, S2, S3, and S4. Edge connection between any two of the nodes S1, S2, S3, and S4 is in correlation with the degree of similarity therebetween, which is represented by an edge score. In one embodiment, random walk is performed on the nodes S1, S2, S3, and S4 of the structure 300 to find a final position from a starting position (e.g. one of the nodes S1, S2, S3, and S4), and the sentence corresponding to the final position (e.g. S4) contains the important information of the text in the document with high probability. To further illustrate the random walk with an example, assuming the edge scores of the nodes S1 to the nodes S2, S3, and S4 are found to be 0.76, 0.5, and 0.34 respectively. If a starting position is set at the node S1, after a first step of the random walk, the next position (i.e. next to the starting position) with the highest probability might be node S2, which has the highest edge score than the others. That is, the higher edge score the more likely the node is to be the next position of the random walk. After a number of steps, the random walk should eventually hover around one node, and this node is viewed as the final position corresponding to the sentence with high probability of containing the important information of the text in the document. Similarly, the probability of each node is found, and the sentences are ranked according to the probabilities of the nodes (e.g. ranking the sentences from the highest probability node to the lowest probability node). The ranking result correlates with the importance rank of the sentences. In other words, the random walk employs the edge scores as derived above in finding the targeted sentence containing the important information of the text in the document.

Referring to FIG. 1 again. As discussed above, ranking the nodes by using the edge scores is used in finding at least one sentence having higher importance than others. The operation S50 is executed to rank the sentences of the document 200 by the processor 120. In operation S50, a square matrix is generated by using the edge scores as elements. For example, if x sentences are extracted from the document 200 (e.g. the x sentences are labeled $s_1$ to $s_x$), the square matrix is a x*x matrix generated by a rule that an element $a_{ij}$ of the x*x matrix represents the edge score of $s_i$ and $s_j$ of the sentences, in which the element $a_{ij}$ is equal to 0 when i=j. Accordingly, the x*x matrix G satisfies:

$$G = \begin{bmatrix} edge(s_1, s_1) & edge(s_1, s_2) & \cdots & edge(s_1, s_x) \\ edge(s_2, s_1) & \ddots & \ddots & edge(s_2, s_x) \\ \vdots & \ddots & \ddots & \vdots \\ edge(s_x, s_1) & \cdots & \cdots & edge(s_x, s_x) \end{bmatrix}$$

where the x sentences are labeled $s_1$ to $s_x$, and an edge score of any two of the sentences is $edge(s_i, s_j)$. For example, $edge(s_1, s_2)$ and $edge(s_2, s_1)$ are the same edge score of the sentences $s_1$ and $s_2$. Furthermore, the diagonal elements of the matrix G are 0's, because the same sentence (e.g. $s_1$ and $s_1$) has no edge connection itself and hence the edge score thereof is 0.

In one embodiment, normalization is performed on each of columns in the matrix G, such that the sum of each of the columns in the normalized matrix $G_n$ is equal to 1. A calculation procedure is then performed on the matrix $G_n$ to execute the sentences ranking. In one embodiment, ranking of each sentence of the document 200 is represented by a vector $\vec{\pi}$ that satisfies:

$$\left(pG_n + \frac{1-p}{x}\vec{1}\vec{1}^T\right)\vec{\pi} = \vec{\pi}; \text{ where } \vec{1} = \begin{bmatrix} 1 \\ \vdots \\ 1 \end{bmatrix},$$

x is the number of the sentences and p is damping factor. For example, p is set to 0.85. Accordingly, the vector $\vec{\pi}$ representing the ranking is the eigenvector of matrix $$pG_n + \frac{1-p}{x}\vec{1}\vec{1}^T$$

and corresponds to eigenvalue 1. As discussed previously, the targeted sentence(s) can be found by the afore-described random walk. In this regard, the calculation procedure involving the equation above is equivalent to implementing the random walk, and thus the vector $\vec{\pi}$, which is a solution for the equation, is equivalent to a result obtained from the random walk. That is, finding the vector $\vec{\pi}$ means the sentence ranking is determined.

Figure 4:
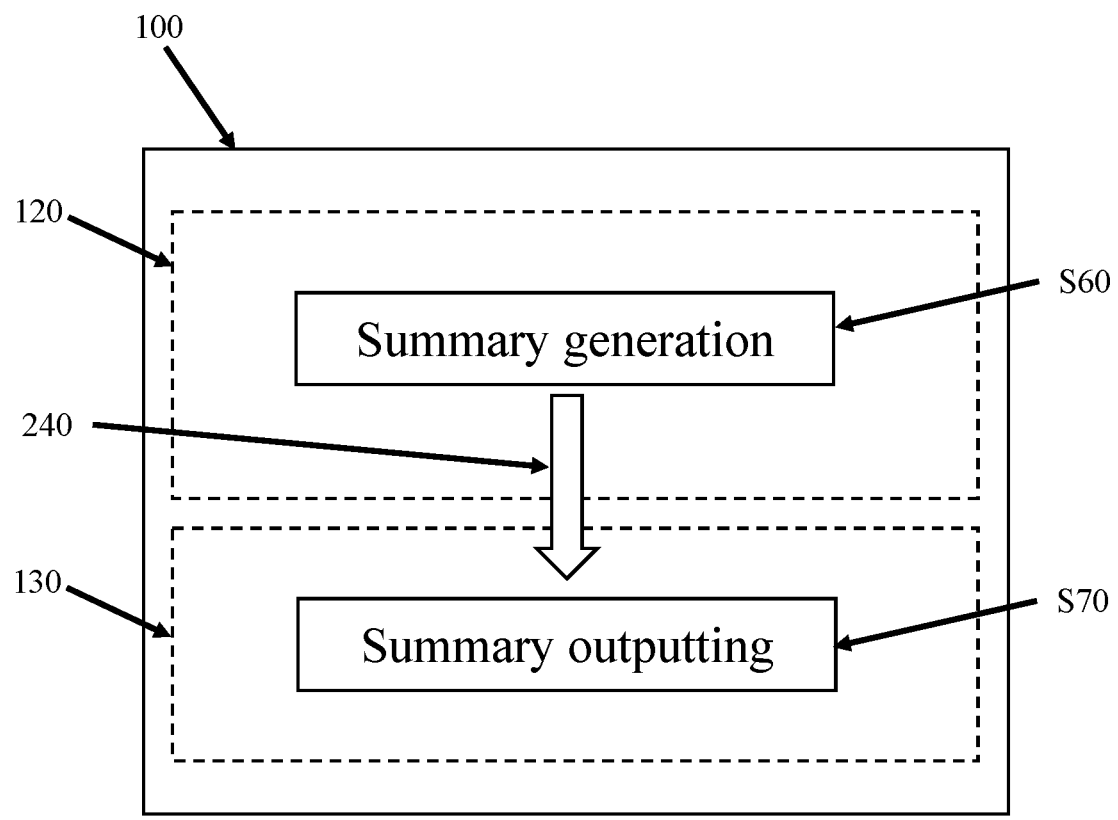
FIG. 4 illustrates a flowchart of operations sequentially following the operation of FIG. 1.

FIG. 4 depicts a flowchart of operations S60 and S70 sequentially following the operation S50 of FIG. 1. The method further includes operations S60 and S70, in which the operation S60 is summary generation and the operation S70 is summary outputting. After the ranking, the operation S60 is sequentially performed by the processor 120. In the operation S60, the ranking result determined by the operation S50 serves as a basis for selecting text features of the document 200. For example, by the vector $\vec{\pi}$, a pre-defined number of top ranking sentences is determined and the sentences (i.e. the top k highest ranked sentences) of the document 200 (see FIG. 1) are extracted, and their text features are applied to generate a summary 240 of the document 200 (see FIG. 1). The generated summary 240 can be outputted by executing the operation S70. In one embodiment, the NLP-based summarizing system 100 further includes an electronic display user interface 130 configured to display the summary 240 of the document, and thus the operation S70 can be executed by an electronic display user interface 130. In various embodiments, the NLP-based summarizing system 100 with the an electronic display user interface 130 can be implemented into an electronic device with a display, such as computer, laptop, cell phone, tablet, or other portable devices.

The electronic embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the electronic embodiments may be executed in one or more computing devices including server computers, personal computers, laptop computers, mobile computing devices such as smartphones and tablet computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Various embodiments of the present invention also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for generating a summary of a textual document by summarizing text with sentence extraction comprising:
    training a natural language processing (NLP) based feature extractor using a training dataset containing words and characters of a selected language, wherein the training comprises constructing a stop-words database of the feature extractor such that the trained feature extractor recognizes stop words in the selected language during a sentence extraction of the textual document;
    training a processor to generate one or more vector spaces by mapping words or phrases to vectors of real numbers and to perform vector calculations;
    extracting a plurality of sentences from a textual document by the trained feature extractor;
    generating a word vector set with respect to each of the plurality of sentences by the processor;
    using the word vector set with respect to each of the plurality of sentences to generate a n-grams vector set and a phrase-n vector set with respect to each of the sentences by the processor, wherein n is a positive integer greater than 1;
    computing a word score representing similarity between the word vector sets, a n-grams score representing similarity between the n-grams vector sets, and a phrase-n score representing similarity between the phrase-n vector sets by the processor;
    combining the word score, the n-grams score, and the phrase-n score to compute an edge score representing similarity between two sentences of the plurality of sentences by the processor;
    computing a ranking of importance on the plurality of sentences using the edge scores of the sentences; and
    generating a summary of the document using a predefined number of top importance-ranking sentences.

2. The method of claim 1, wherein the word vector set with respect to each of the sentences has a plurality of first feature vectors, the n-grams vector set with respect to the corresponding sentence has a plurality of second feature vectors, and each of the second feature vectors is generated by a sum of the n first feature vectors.

3. The method of claim 2, wherein the first feature vectors are respectively labeled as a sequence of numbers with positive integers, and each of the second feature vectors is generated by a sum of the n first feature vectors labeled with the consecutive positive integers.

4. The method of claim 1, wherein the word vector set with respect to each of the sentences has a plurality of first feature vectors, the phrase-n vector set with respect to the corresponding sentence has a plurality of third feature vectors, and each of the third feature vectors is generated by concatenating the n first feature vectors in the same column.

5. The method of claim 4, wherein the first feature vectors are respectively labeled as a sequence of numbers with positive integers, and each of the third feature vectors is generated by concatenating the n first feature vectors labeled with the consecutive positive integers in the same column.

6. The method of claim 1, wherein the edge score of the two sentences is derived by an equation:

$$ES = \alpha * s1 + \Sigma_{n=2}^{k} \beta_n * s2 + \Sigma_{n=2}^{k} \gamma_n * s3;$$

wherein ES is the edge score, s1 is the word score derived from the word vector sets of the two sentences, s2 is the n-grams score derived from the n-grams vector sets of the two sentences, s3 is the phrase-n score derived from the phrase-n vector sets of the two sentences, K is an integer greater than or equal to n, and $\alpha$, $\beta_n$, and $\gamma_n$ are positive and a sum of $\alpha$, $\beta_n$, and n is equal to 1.

7. The method of claim 1, wherein the computation of word score comprises:
    spanning the word vector sets of the two sentences to generate a first matrix and a second matrix respectively;
    deriving matrix multiplication from the first matrix and the second matrix;
    determining diagonal elements of a diagonal matrix which is generated by performing singular value decomposition (SVD) on the matrix multiplication; and
    summing up the diagonal elements of the diagonal matrix to compute the word score.

8. The method of claim 1, wherein the computation of n-grams score comprises:
    spanning the n-grams vector sets of the two sentences to generate a first matrix and a second matrix respectively;
    deriving matrix multiplication from the first matrix and the second matrix;
    determining diagonal elements of a diagonal matrix which is generated by performing singular value decomposition (SVD) on the matrix multiplication; and
    summing up the diagonal elements of the diagonal matrix to compute the n-grams score.

9. The method of claim 1, wherein the computation of phrase-n score comprises:
    spanning the phrase-n vector sets of the two sentences to generate a first matrix and a second matrix respectively;
    deriving matrix multiplication from the first matrix and the second matrix;
    determining diagonal elements of a diagonal matrix which is generated by performing singular value decomposition (SVD) on the matrix multiplication; and
    summing up the diagonal elements of the diagonal matrix to compute the phrase-n score.

10. The method of claim 1, wherein the number of the sentences extracted from the document is x and the sentences are labeled as a sequence of numbers with $s_1$ to $s_x$, and the method further comprises:
    generating a x by x matrix, wherein an element $a_{ij}$ of the x by x matrix represents the edge score of $s_i$ and $s_j$ of the sentences, and the element $a_{ij}$ is equal to 0 when i=j.

11. An apparatus for summarizing text with sentence extraction comprising:
    a natural language processing (NLP) based feature extractor trained using a training dataset containing words and characters of a selected language, wherein the training comprises constructing a stop-words database of the feature extractor such that the trained feature extractor recognizes stop words in the selected language during a sentence extraction of the textual document;

wherein the feature extractor is further configured to extract a plurality of different sentences from a document comprising text; and a processor trained to generate one or more vector spaces by mapping words or phrases to vectors of real numbers and to perform vector calculations;

wherein the processor is further configured to generate a word vector set with respect to each of the plurality of different sentences and use the word vector set with respect to each of the plurality of different sentences to generate a n-grams vector set and a phrase-n vector set with respect to each of the sentences, wherein n is a positive integer greater than 1;

wherein the processor is further configured to compute a word score representing similarity between the word vector sets, a n-grams score representing similarity between the n-grams vector sets, and a phrase-n score representing similarity between the phrase-n vector sets, and the word score, the n-grams score, and the phrase-n score are combined to compute an edge score representing similarity between two sentences of the plurality of different sentences; wherein the processor is further configured to compute a ranking of importance on the plurality of different sentences using the edge scores of the sentences; and wherein the processor is further configured to generate a summary of the document using a pre-defined number of top importance-ranking sentences.

12. The apparatus of claim 11, further comprising an electronic display user interface configured to display the summary of the document.

13. The apparatus of claim 11, wherein the word vector set with respect to each of the sentences has a plurality of first feature vectors, the n-grams vector set with respect to the corresponding sentence has a plurality of second feature vectors, and each of the second feature vectors is generated by a sum of the n first feature vectors.

14. The apparatus of claim 13, wherein the first feature vectors are respectively labeled as a sequence of numbers with positive integers, and each of the second feature vectors is generated by a sum of the n first feature vectors labeled with the consecutive positive integers.

15. The apparatus of claim 11, wherein the word vector set with respect to each of the sentences has a plurality of first feature vectors, the phrase-n vector set with respect to the corresponding sentence has a plurality of third feature vectors, and each of the third feature vectors is generated by concatenating the n first feature vectors in the same column.

16. The apparatus of claim 15, wherein the first feature vectors are respectively labeled as a sequence of numbers with positive integers, and each of the third feature vectors is generated by concatenating the n first feature vectors labeled with the consecutive positive integers in the same column.

17. The apparatus of claim 11, wherein the processor is further configured to derived the edge score of the two sentences by an equation:

$$ES = \alpha * s1 + \Sigma_{n=2}^{k} \beta_n * s2 + \Sigma_{n=2}^{k} \gamma_n * s3;$$

wherein ES is the edge score, s1 is the word score derived from the word vector sets of the two sentences, s2 is the n-grams score derived from the n-grams vector sets of the two sentences, s3 is the phrase-n score derived from the phrase-n vector sets of the two sentences, K is an integer greater than or equal to n, and $\alpha$, $\beta_n$, and n are positive and a sum of $\alpha$, $\beta_n$, and $\gamma_n$ is equal to 1.

18. The apparatus of claim 11, wherein the processor is further configured to execute spanning the n-grams vector sets of the two sentences to generate a first matrix and a second matrix respectively, deriving matrix multiplication from the first matrix and the second matrix, determining diagonal elements of a diagonal matrix which is generated by performing singular value decomposition (SVD) on the matrix multiplication, and summing up the diagonal elements of the diagonal matrix to compute the n-grams score.

19. The apparatus of claim 11, wherein the processor is further configured to execute spanning the phrase-n vector sets of the two sentences to generate a first matrix and a second matrix respectively, deriving matrix multiplication from the first matrix and the second matrix, determining diagonal elements of a diagonal matrix which is generated by performing singular value decomposition (SVD) on the matrix multiplication, and summing up the diagonal elements of the diagonal matrix to compute the phrase-n score.

20. The apparatus of claim 11, wherein the number of the sentences extracted from the document is x that is a positive integer and the sentences are labeled as a sequence of numbers with $s_1$ to $s_x$, and the processor is further configured to execute generating a x by x matrix, wherein an element $a_{ij}$ of the x by x matrix represents the edge score of $s_i$ and $s_j$ of the sentences, and the element $a_{ij}$ is equal to 0 when i=j.

* * * * *